Oct. 9, 1956

C. L. BROWNLOW 2,766,427

LINE FAULT DETECTOR

Filed Feb. 18, 1952

INVENTOR.
CECIL L. BROWNLOW
BY Hudson & Young
ATTORNEYS

Oct. 9, 1956
C. L. BROWNLOW
2,766,427
LINE FAULT DETECTOR
Filed Feb. 18, 1952
3 Sheets-Sheet 2
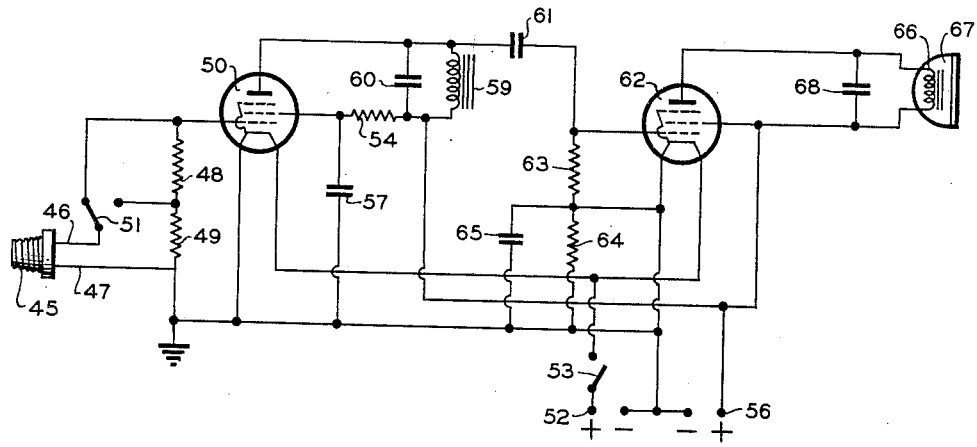
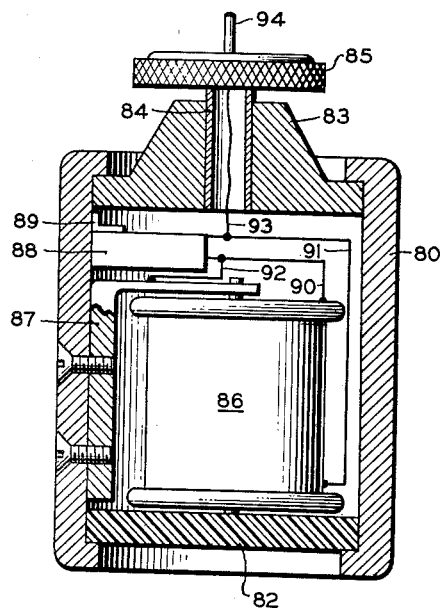
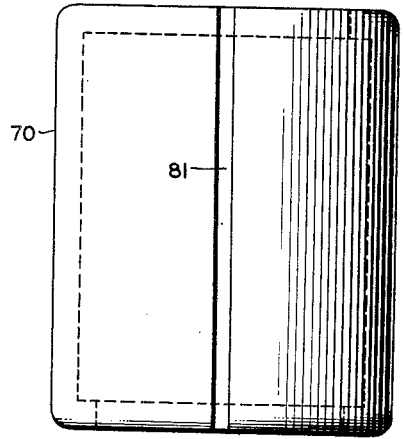
*INVENTOR.*
CECIL L. BROWNLOW
BY *Hudson & Young*
*ATTORNEYS*

Oct. 9, 1956
C. L. BROWNLOW
2,766,427
LINE FAULT DETECTOR
Filed Feb. 18, 1952
3 Sheets-Sheet 3
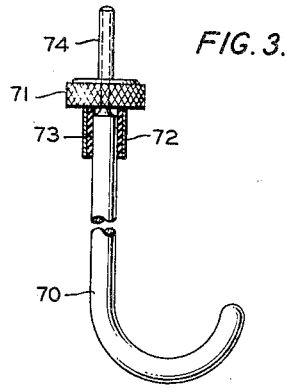
FIG. 3.
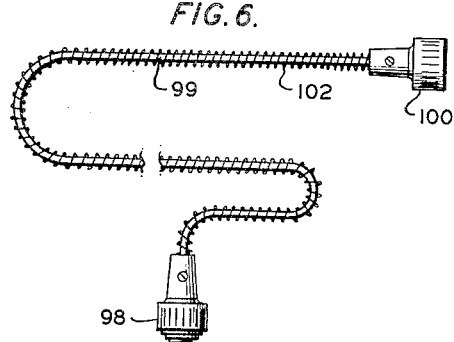
FIG. 6.
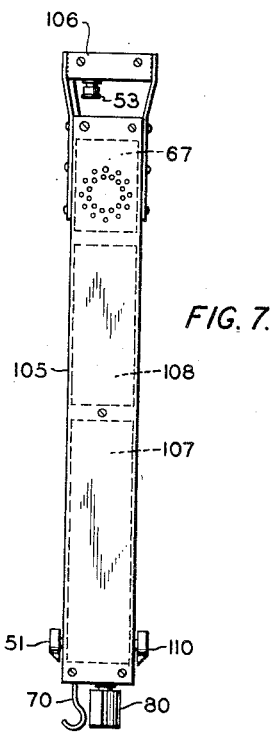
FIG. 7.
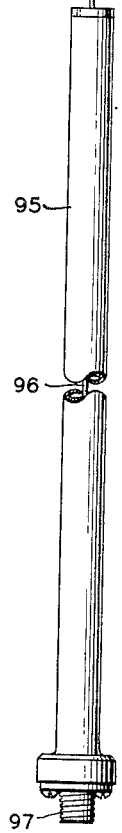
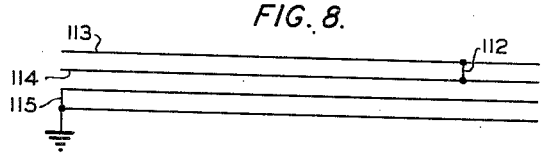
FIG. 8.
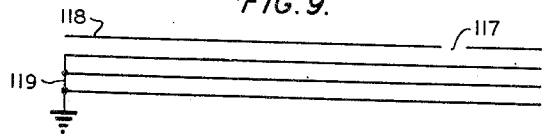
FIG. 9.
INVENTOR.
CECIL L. BROWNLOW
BY Hudson & Young
ATTORNEYS

United States Patent Office 2,766,427
Patented Oct. 9, 1956

2,766,427

LINE FAULT DETECTOR

Cecil L. Brownlow, Bartlesville, Okla., assignor to Phillips Petroleum Company, a corporation of Delaware Application February 18, 1952, Serial No. 272,033

6 Claims. (Cl. 324—51)

This invention relates to a method of locating a fault in a multiconductor cable. In another aspect, it relates to an inductive pickup or probe for determining the strength of an electromagnetic field surrounding the cable. In still another aspect it relates to a capacitive pick-up or probe for determining the strength of an electrostatic field surrounding the cable.

This application is a continuation-in-part of my co-pending application Serial No. 53,925, filed October 11, 1948, entitled Line Fault Detector, now Patent No. 2,586,781.

Heretofore, various attempts and proposals have been made relating to methods and apparatus for determining the location of a short or open circuit in a faulted conductor. Such systems ordinarily utilize at least three of the cable conductors for the purpose of producing a field about the cable of such nature that the location of the fault can be determined. These systems are sometimes critical in operation due to variations in spacing between the conductors, and it is necessary to use switching apparatus operated at a high rate of speed in order that the fault location may be identified. Such switching arrangements require frequent adjustment and are difficult to operate reliably under conditions encountered in the field.

I have discovered a simple and inexpensive method of locating a fault in a conductor in which all conductors of the cable are grounded with the exception of the faulted conductor. In carrying out my method, the faulted conductor is located by known methods and it is also determined whether the fault consists of a short or open circuit. In the former case, I pass a heavy current through the faulted conductor and determine the location of the short circuit by measurement of the inductive field about the conductor. In the latter case, I apply a relatively high voltage between the open circuited conductor and ground, the location of the open circuit being determined by measurement of the electrostatic field about the cable. In carrying out this method, I utilize a transmitter particularly adapted for producing the aforesaid inductive and electrostatic fields together with a probe of novel construction for measuring the field about the cable.

It is an object of the invention to provide an improved method of locating a fault in a multi-conductor cable.

It is a further object of the invention to provide an inductive probe of improved construction for determining electromagnetic field strength about a cable.

It is a still further object of the invention to provide a capacitive probe of improved construction for determining electrostatic field strength about a cable.

It is a still further object of the invention to provide apparatus which is reliable in operation, rugged in construction, and which is economical to build and manufacture.

Various other objects, advantages and features of the invention will become apparent from the following detailed description taken in conjunction with the accompanying drawings, in which:

Figure 2 is a schematic circuit diagram of the receiver circuit;

Figure 3 is a vertical sectional view, partially in elevation, of an improved capacitive probe;

Figure 4 is a vertical sectional view, partially in elevation, of an improved inductive probe;

Figure 5 is a front elevational view of the probe casing;

Figure 6 is a front elevation detailed view of a connecting unit adapted for use with either the inductive or capacitive probe;

Figure 7 is a front elevation view of a combined receiver circuit and probe assembly; and Figures 8 and 9 are diagrammatic views illustrating features of the invention.

Figure 1:
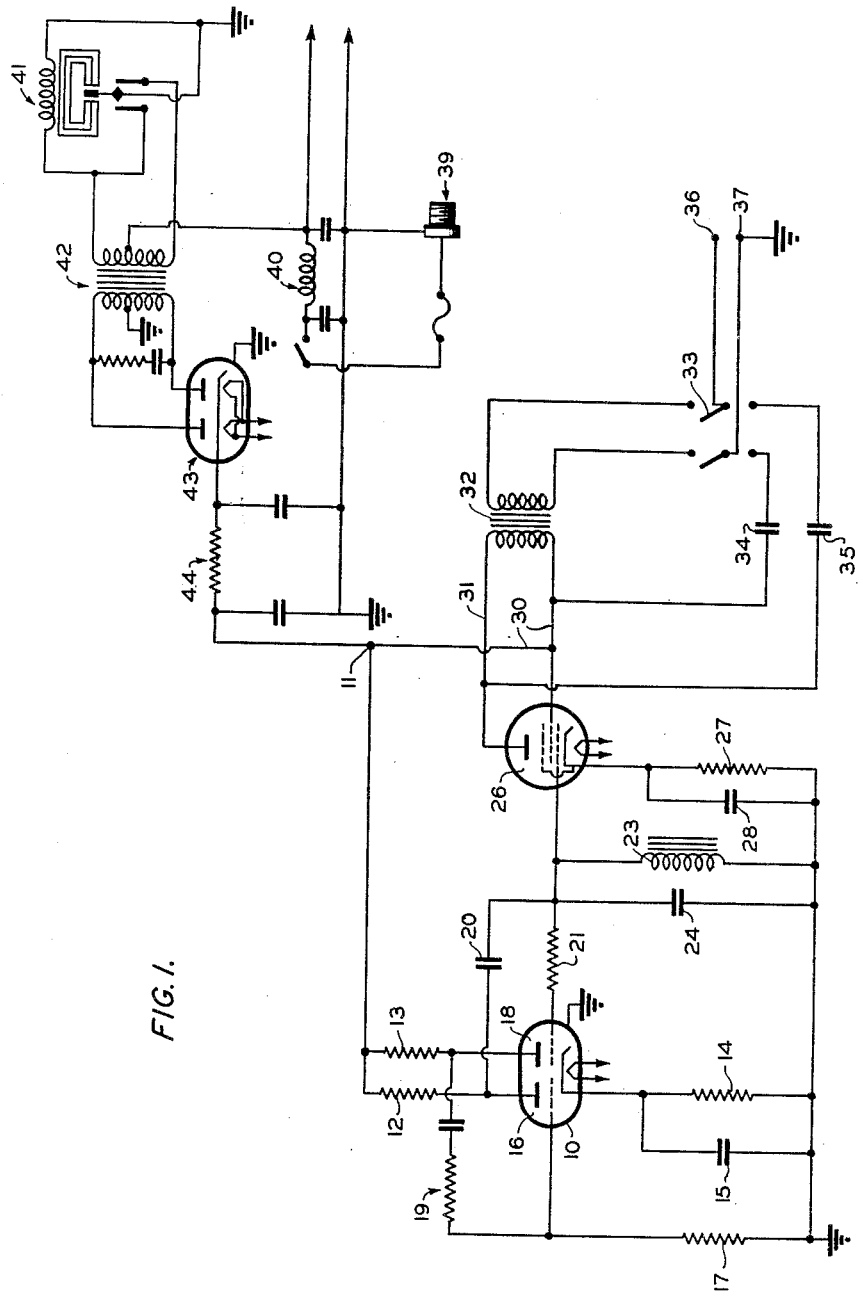
Figure 1 is a schematic circuit diagram of the transmitter circuit.

Referring now to the drawings in detail, and particularly to Figure 1, I have shown a transmitter circuit for producing an electric current which may have a frequency of about 1,000 cycles per second, or any other suitable frequency in the audio range. The pulses are produced by an oscillator circuit including a dual triode 10 having its anodes connected to a positive power supply terminal 11 through resistors 12 and 13, respectively. The common cathode of the tubes is connected through a resistor 14 to ground and this resistor is shunted by a condenser 15. The control grid of triode section 16 is connected to ground through a resistor 17 and to the anode of triode section 18 through a resistance-capacitance unit 19 while the anode of section 16 is connected through a condenser 20 and a resistor 21 to the control grid of section 18. The circuits are such that triode sections 16, 18 are alternately conductive, the flow of anode current through each triode section producing the voltage pulse to initiate operation of the other triode section after a suitable time delay determined by the time constants of resistance-capacitance units 19 and 20, 21. The frequency of the oscillator is determined by a resonant circuit consisting of a choke or inductance 23 shunted by a condenser 24, this circuit being connected between ground and the junction of condenser 20 with resistor 21. The oscillator has been found to produce a very stable output having a generally sinusoidal wave form.

The output of the oscillator is fed to the control grid of a tube 26 which is preferably but not necessarily a pentode. The suppressor grid of the tube is connected to the cathode thereof which is grounded through a resistor 27 shunted by a condenser 28. The screen grid of the tube is connected to positive supply terminal 11 by a lead 30 while the anode of the tube is connected by a wire 31 to one primary terminal of the output transformer 32, the other primary terminal being connected by lead 30 to positive power supply terminal 11.

The secondary winding of the transformer 32 is connected to one set of terminals of a double pole double throw switch 33 and the other set of switch terminals is connected through condensers 34 and 35, respectively, to the conductors 30 and 31. The blades of switch 33 are connected, respectively, to output terminals 36 and 37, the latter terminal being provided with a ground connection.

The power supply unit is of a type well adapted for portable work and includes an input plug 39, an input filter 40, a vibratory interrupter 41, a power transformer 42, a rectifier 43, and an output filter 44, this unit supplying filtered direct current of low voltage to the heaters of tubes 10, 26 and a positive anode voltage to the power supply terminal 11.

The generally sinusoidal alternating voltage produced by the oscillator is amplified by pentode 26 and fed to output terminals 36 and 37. With switch 33 in its upper position, a heavy current is obtained from transformer 32 and the secondary winding of the transformer provides an inductive load substantially matching the impedance of the conductor in which the fault is to be located. With switch 33 in its lower position, a smaller current is obtained at relatively high voltage and the condensers 34, 35 provide capacitive coupling substantially matching the capacitance of the conductor in which the fault is to be located.

The receiver is illustrated in Figure 2 and comprises a plug 45 connected to input leads 46 and 47 which are connected selectively to the output of either the inductive or capacitive probe. In operation, the probe is moved along the cable and it is responsive, depending on its construction, to either the electromagnetic or electrostatic field surrounding the cable. Grid resistances 48, 49 are connected in series between the control grid of a pentode 50 and ground, and the signal from leads 46, 47 is fed to the grid of tube 50 through a switch 51 which selectively connects lead 46 either directly to the control grid, or to the junction between resistors 48 and 49. Accordingly, switch 51 is effective to vary the gain or sensitivity of the receiver.

Tube 50 is of the filament type and has one filament terminal grounded with the other filament terminal extending to a positive source of filament voltage 52 through a switch 53 and the suppressor grid of the tube is connected to the grounded filament terminal. The screen grid of the tube is connected through a resistor 54 to a positive battery terminal 56 and through a condenser 57 to ground. The anode of tube 50 includes a tuned resonant circuit consisting of a choke 59 shunted by a condenser 60, this resonant circuit being connected between the anode of the tube and positive terminal 56. The resonant circuit is tuned to the frequency of the transmitter so that the transmitter output is selectively amplified.

The output of tube 50 is fed through a coupling condenser 61 to the control grid of an amplifier pentode tube 62. The control grid of the tube 62 also is grounded through series connected resistors 63 and 64, the latter having a condenser 65 connected in shunt therewith. The suppressor grid of tube 62 is connected to the filament of said tube, which filament in turn is connected between positive terminal 52 and the ground. The screen grid of tube 62 is connected directly to positive terminal 56, and the anode is connected to positive terminal 56 through the load coil 66 of a speaker unit 67. A condenser 68 is connected in shunt with load coil 66. It will be apparent that the receiver of Figure 2 picks up the signals produced by the transmitter and selectively amplifies them, the amplified signals in turn actuating the speaker unit 67 so as to provide an audible indication of the condition being detected. Further, the speaker may be adjusted to high or low sensitivity by operation of switch 51.

As previously stated the signal to input leads 46, 47 is supplied by a probe which produces a voltage responsive to the presence of an electric field surrounding the cable to be tested. Where the faulted conductor is open circuited a capacitive probe is used to detect the presence of an electrostatic field. This probe can consist of an electrical conduit which is bent in the form of a hook so that it will follow the cable to be tested. A unit of this type is illustrated in Figure 3. Where it is desired to detect the presence of an electromagnetic field it is preferred to use the improved inductive probe illustrated in Figures 4 and 5.

The capacitive probe of Figure 3 consists of a metallic conduit 70, the lower end of which is curved to engage the cable being tested. The upper end of conduit 70 is secured to a connector cap 71 by means of a sleeve 72 and electrically insulated therefrom by an inner sleeve 73 formed of an insulating material such as Bakelite. Cap 71 is provided with an axial passage through which an extended portion 74 of conduit 70 protrudes.

The inductive probe unit illustrated in Figures 4 and 5 consists of a generally cylindrical casing 80 of non-magnetic material, such as aluminum, having a longitudinal slot formed therein, which slot is filled with a strip 81 of insulating material, such as Bakelite. A pair of spaced end caps define a closed chamber within the shielding plate, one end cap consisting of a Bakelite insulating disk 82 and the other end cap consisting of an electrically conducting non-magnetic member 83, preferably formed of brass, and having a frusto-conical portion protruding beyond casing 80. End cap 83 contains an axial passage 84 for receiving a connector cap 85. The ends of casing 80 are spun over end caps 82 and 83 so as to form a rigid assembly, and a suitable sealing material such as wax, is placed around the end caps and within casing 80 to exclude moisture or other deleterious substances from the interior of the chamber. Mounted within the chamber is an inductor 86 which is carried by bracket 87 suitably secured to casing 80. A condenser 88 is also mounted within the chamber by a bracket 89, and the terminals of this condenser are connected in parallel with the inductor terminals by leads 90, 91. Lead 90 is grounded to the casing 80 by a wire 92 and lead 91 is connected by lead 93 to a plug 94 mounted on, but insulated from, cap 85. The constants of the inductor and condenser are such that the unit has a resonant frequency of about 1000 cycles or such other audio frequency as may be produced by the transmitter.

The slotted casing surrounds the coil and functions as an electrostatic shield. It is slotted to prevent having a shorted one turn inductor surrounding the probe. When the pick-up or probe is placed adjacent the cable, the presence of an electromagnetic field about the conductor produces a variable flux in the open end of the iron core within the coil 86, thereby inducing a corresponding electric current in the resonant circuit consisting of the coil and condenser. The described probe has been found to be very sensitive and to accurately detect the presence of very small electromagnetic fields about the cable.

The connecting unit illustrated in Figure 6 is provided to selectively connect either the inductive or capacitive probes to input leads 46, 47 of Figure 2. This connecting unit consists of a hollow metallic conduit 95 containing an axial electrode 96 insulated therefrom. The lower end of conduit 95 has a threaded bushing 97 secured thereto for selectively engaging either cap 71 of the capacitive probe or cap 85 of the inductive probe. The upper end of conduit 95 is threaded to receive a plug 98, which in turn is attached to a flexible metallic shielded one wire conductor 99. The other end of conductor 99 is attached to a cap 100 which is threaded to receive plug 45 of the receiving circuit. A flexible wire 102 is coiled about conductor 99 so as to prevent tangling of said conductor.

This connecting unit of Figure 6 serves to electrically connect lead 46 with either lead 91 or electrode 74. Lead 46 is connected with the single wire contained in conductor 98, which wire makes contact with the electrode 96, which in turn selectively engages either electrode 74 of the capacitive anode or electrode 94 of the inductive unit. The shielded covering of conductor 99 makes contact with conduit 95 thereby completing the grounded connection from casing 80 of the inductive probe to lead 47 of the receiving circuit. It should be apparent that conduit 95 serves both as an electrical connecting member between the probe units and the receiving circuit, and also as a carrying support for the two probe units.

In practicing the invention, a continuity tester is utilized to determine which conductor or conductors of the cable are faulted and whether the fault consists of a short or open circuit. If a short circuit is found to exist between two of the conductors in the cable, the output from terminals 36, 37 of the transmitter is applied to the short circuited conductors and switch 33 is thrown to its upper position to provide high current and low impedance output. In the example of Figure 8, a short circuit is indicated at 112 between conductors 113, 114 of the cable and the transmitter output is applied to the free end of said conductors 113 and 114. The rest of the conductors in the cable are grounded, as indicated at 115. Thereupon, the inductive probe of Figure 4 is connected to receiver input leads 46, 47 and the receiver-probe unit is moved along within 5 feet of the cable. The transmitter provides a strong electromagnetic field about the cable between the fault and point of application of the transmitter current while, beyond the fault, there is a negligible field. Accordingly, the location of the fault is accurately determined by noting the position at which the receiver indicates an abrupt decrease in the electromagnetic field strength. It is desirable to adjust switch 51 so as to provide high receiver sensitivity until the approximate location of the fault is found and then to adjust the receiver to low sensitivity to find the precise location of the fault.

When it is determined that an open circuit exists in a conductor of the cable, all of the cable conductors, with the exception of the faulted one, are grounded and the transmitter voltage is applied between the faulted conductor and ground, the switch 33 being thrown to its lower position to provide a high voltage high impedance output circuit, and a capacitive coupling to the cable. In Figure 9, the open circuit is indicated at 117, conductor 118 is the faulted wire, and all of the remaining conductors are grounded at 119. The voltage from the transmitter is applied at either end of the cable between conductor 118 and ground. It will be apparent that a substantial electrostatic field will exist around the cable from the point of application of the voltage to the location of the open circuit while substantially no field will exist beyond the open circuit. The absence of any stray field in the conductor 118 beyond the open circuit fault 117 is made certain by grounding separately all of the other conductors 119 whereby they carry no current and are not in the ground path of any current so they cannot act as floating plates to cause stray fields and erratic operation, which might be due to charges on wires 119 and such charges inducing a field in conductor 118 to the right of fault 117 as shown in Figure 9. The presence of this field is indicated by the capacitive probe previously mentioned which is connected to input leads 46, 47 of the receiver. In this case too, the probe-receiver unit is moved along the cable and the position of the fault located by noting the position at which there is a sharp decrease in the electrostatic field. The switch 51 of the receiver is adjusted to provide high sensitivity to determine approximate location of the fault and low sensitivity to determine the precise location of the circuit.

The present method has been found to provide highly accurate results in determining the location of the fault in the cable. The fact that it is possible to ground all cable conductors except those actually under test largely eliminates stray fields and permits very accurate readings to be obtained. The construction of the receiver, probe, and transmitter units is such that they are readily adapted to be manufactured in portable form. By using this apparatus, the exact position of the faulted conductor on the circumference of the cable is located before making an incision in the cable for purpose of repairs or of making tap connections. The equipment may be readily manufactured from the standard circuit components and is extremely simple to adjust in actual field work.

In Figure 7 there is illustrated a modified form of receiving unit wherein the receiving circuit and probes are contained within a single compact carrying unit. This carrying unit takes the form of a generally rectangular box 105 provided with a carrying handle 106. Enclosed within box 105 is a first compartment 107 adapted to enclose the receiving circuit of Figure 2. In a second compartment 108 there are mounted the various batteries necessary to supply operating potentials to the vacuum tubes of the receiving circuit enclosed in compartment 107. The speaker unit 67 is mounted in an upper compartment of box 105. Both the capacitive and inductive probes are secured to the lower end of box 105 and are adapted to be connected selectively into the receiving circuit by means of a selector switch 110. Sensitivity switch 51 also is mounted near the lower end of box 105 and an on-off switch 53 is mounted on handle 106. The advantage of the unit illustrated in Figure 7 resides in providing a single housing for the pick-up probes and receiving circuit. This unit can be carried by hand along the cable being tested.

While the invention has been described in connection with a present, preferred embodiment thereof, it is to be understood that this description is illustrative only and is not intended to limit the invention.

Having described my invention, I claim:

1. An inductive pickup for indicating the presence of an electromagnetic field comprising, in combination, an elongated generally cylindrical shielding plate of non-magnetic material having a longitudinal slot formed therein extending the length of said plate, said slot being filled with a strip of non-conductive material, a first end cap of non-conductive non-magnetic material disposed across one end of said shielding plate, a second end cap of electrically conductive non-magnetic material disposed across the other end of said shielding plate, said first and second end caps defining a closed chamber with said shielding plate, whereby said first and second caps constitute the sole end enclosures of said chamber, a connector plug mounted in said second end cap in sealed relation therewith, an induction coil mounted within said chamber, a capacitor mounted within said chamber and electrically connected in parallel arrangement with said induction coil, and circuit means connecting said coil-capacitor unit to said connector plug.

2. The combination in accordance with claim 1 wherein said coil-capacitor unit has a resonant frequency within the audio range.

3. An inductive pickup for indicating the presence of an electromagnetic field comprising, in combination, an elongated generally cylindrical shielding plate of non-magnetic material having a longitudinal slot formed therein extending the length of said plate, said slot being filled with a strip of non-conductive material, a first end cap of non-conductive non-magnetic material disposed across one end of said shielding plate, a second end cap of electrically conductive non-magnetic material disposed across the other end of said shielding plate, the ends of said plate being bent over said end caps thereby defining a closed chamber with said shielding plate, whereby said first and second caps constitute the sole end enclosures of said chamber, a connector plug mounted in said second end cap in sealed relation therewith, an induction coil mounted within said chamber, a capacitor mounted within said chamber and electrically connected in parallel arrangement with said induction coil, and circuit means connecting said coil-capacitor unit to said connector plug.

4. An inductive pickup for indicating the presence of an electromagnetic field comprising, in combination, an elongated generally cylindrical aluminum shielding plate having a longitudinal slot formed therein extending the length of said plate, a non-conductive strip disposed in said slot, an end cap of non-conductive, non-magnetic material disposed across one end of said shielding plate, a brass end cap disposed across the other end of said shielding plate, the ends of said plate being bent over said end caps thereby defining a closed chamber with said plate, whereby said first and second caps constitute the sole end enclosures of said chamber, a connector plug having first and second terminals mounted in said brass end cap in sealed relation therewith, said first terminal making electrical contact with said brass end cap, and induction coil mounted in said chamber having one terminal thereof connected to said plate and the other terminal thereof connected to the second terminal of said plug, and a capacitor mounted in said chamber and shunted across the terminals of said induction coil.

5. An inductive pickup for indicating the presence of an electromagnetic field comprising, in combination, an elongated generally cylindrical shielding plate of electrically conductive non-magnetic material having a slot formed therein, said slot being filled with a strip of non-conductive material, a first end cap of non-conductive non-magnetic material disposed across one end of said shielding plate, a second end cap of electrically conductive non-magnetic material disposed across the other end of said shielding plate, said first and second end caps defining a closed chamber with said shielding plate, whereby said first and second caps constitute the sole end enclosures of said chamber, a connector plug having first and second terminals mounted in said second end cap in sealed relation therewith, said first terminal making electrical contact with said plate, an induction coil mounted in said chamber having one terminal thereof connected to said plate and the other terminal thereof connected to the second terminal of said plug, and a capacitor mounted in said chamber and shunted across the terminals of said induction coil.

6. The combination in accordance with claim 5 further comprising an electrically conductive conduit enclosing an insulated electrical lead, one end of said conduit abutting said second end cap, said conduit being in electrical contact with said first terminal, and said lead being in electrical contact with said second terminal whereby said conduit serves as a support member for said inductive pickup.

References Cited in the file of this patent
UNITED STATES PATENTS

| 1,641,374 | Chryst | Sept. 6, 1927 |
| 2,103,179 | Rennau | Dec. 21, 1937 |
| 2,338,245 | Hays et al. | Jan. 4, 1944 |
| 2,388,848 | Howe | Nov. 13, 1945 |

FOREIGN PATENTS

| 463,676 | Great Britain | Apr. 5, 1937 |